United States Patent
Midgett et al.

(10) Patent No.: US 12,123,538 B2
(45) Date of Patent: Oct. 22, 2024

(54) COVER FOR A TUBULAR

(71) Applicant: End Elements, LLC, Oklahoma City, OK (US)

(72) Inventors: Emily A. Midgett, Oklahoma City, OK (US); Matthew W. Midgett, Oklahoma City, OK (US)

(73) Assignee: End Elements, LLC, Oklahoma City, OK (US)

( * ) Notice: Subject to any disclaimer, the term of this patent is extended or adjusted under 35 U.S.C. 154(b) by 855 days.

(21) Appl. No.: 17/201,163

(22) Filed: Mar. 15, 2021

(65) Prior Publication Data

US 2021/0285592 A1 Sep. 16, 2021

Related U.S. Application Data

(60) Provisional application No. 62/990,103, filed on Mar. 16, 2020.

(51) Int. Cl.
*F16L 57/00* (2006.01)
*F16L 58/18* (2006.01)

(52) U.S. Cl.
CPC .......... *F16L 57/005* (2013.01); *F16L 58/182* (2013.01)

(58) Field of Classification Search
CPC ............................. F16L 57/005; F16L 58/182
USPC ........................................................ 150/154
See application file for complete search history.

(56) References Cited

U.S. PATENT DOCUMENTS

| | | |
|---|---|---|
| 2,156,221 A | 4/1939 | Kahn et al. |
| 2,159,292 A | 5/1939 | Kahn et al. |
| 2,316,013 A | 4/1943 | Mulholland |
| 2,708,896 A | 5/1955 | Smith et al. |
| 2,942,625 A | 6/1960 | Costanzo |
| 3,485,271 A | 12/1969 | Halsey |
| 4,487,228 A | 12/1984 | Waldo et al. |
| 5,044,403 A | 9/1991 | Chen |
| 5,452,749 A | 9/1995 | Johnson et al. |
| 5,687,773 A | 11/1997 | Ryan et al. |
| 6,102,076 A | 8/2000 | Romero, Jr. et al. |
| 6,332,478 B1 | 12/2001 | Holden et al. |
| 6,367,508 B1 | 4/2002 | Richards et al. |
| 7,281,546 B2 | 10/2007 | Goodson et al. |
| 7,284,770 B2 | 10/2007 | Dell'erba et al. |
| 7,810,845 B2 | 10/2010 | Knappmiller |
| 2009/0050230 A1 | 2/2009 | Heritier et al. |
| 2012/0312411 A1 | 12/2012 | Lubbers |

*Primary Examiner* — Sue A Weaver
(74) *Attorney, Agent, or Firm* — Dunlap Codding, P.C.

(57) ABSTRACT

A cover for a tubular having at least one threaded region. The cover has an inner sleeve having a closed end and an open end and formed of a fluid absorbent material. The inner sleeve is positionable about the threaded region of the tubular. The cover further has an outer sleeve having a closed end and an open end and formed of fluid resistant material. The outer sleeve is disposed about the inner sleeve.

15 Claims, 6 Drawing Sheets

COVER FOR A TUBULAR

CROSS-REFERENCE TO RELATED APPLICATIONS

This application claims the benefit of U.S. Provisional Application No. 62/990,103, filed Mar. 16, 2020, entitled "COVER FOR A TUBULAR"; the entire contents of which is hereby expressly incorporated herein by reference.

BACKGROUND

Drill pipe, tubing, and casing (tubulars) for oil and gas drilling, completion, production, and stimulation activities are typically held in a storage or pipe yard after they have been received from the fabricator or returned from downhole use. A major industry has developed in protection of such oil field tubular goods to prevent them from corroding during periods of storage. The storage is not permanent, typically extending for several weeks or until a need arises for a specific size and grade of the tubular in question. The tubulars are typically cleaned and drifted before storage to prepare them for shipment to the rig site at a future date. However, corrosion due to water and oxygen may quickly attack the precisely machined threads, which then cannot provide a satisfactory threaded connection. Thread corrosion may be ordinary oxidation, or rust, or maybe aggravated by micro-organisms which feed on various materials on the surface of the thread, producing an acid, which causes pitting of the threads.

The exposed threaded ends of metal tubulars are conventionally protected by some supplemental means to extend their storage life. For example, physical thread protectors in the form of plastic or elastomeric end caps or end caps made from metals, such as steel, brass, or copper, have been placed on the threaded ends of tubulars to provide protection from physical abuse and from corrosion. However, such rigid end caps fail to absorb moisture that may accumulate on the threads. Further, such rigid end caps can be cumbersome and difficult to position on and remove from the ends of heavy tubulars.

A need exists for a cover that absorbs and resists moisture to protect and extend the life of the threads of a tubular. A need also exists for a cover relatively easy to position on and remove from the ends of a tubular. It is to such a cover that the inventive concepts disclosed herein are directed.

DETAILED DESCRIPTION OF EXEMPLARY EMBODIMENTS

In the following detailed description of embodiments of the inventive concepts, numerous specific details are set forth in order to provide a more thorough understanding of the inventive concepts. However, it will be apparent to one of ordinary skill in the art that the inventive concepts disclosed and claimed herein may be practiced without these specific details. In other instances, well-known features have not been described in detail to avoid unnecessarily complicating the instant disclosure.

As used herein, the terms "comprises," "comprising," "includes," "including," "has," "having" or any other variation thereof, are intended to cover a non-exclusive inclusion. For example, a process, method, article, or apparatus that comprises a list of elements or steps is not necessarily limited to only those elements or steps and may include other elements, steps, or features not expressly listed or inherently present therein.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B is true (or present).

In addition, use of the "a" or "an" are employed to describe elements and components of the embodiments herein. This is done merely for convenience and to give a general sense of the inventive concepts. This description should be read to include one or at least one and the singular also includes the plural unless it is obvious that it is meant otherwise.

Throughout this disclosure and the claims, the terms "about," "approximately," and "substantially" are intended to signify that the item being qualified is not limited to the exact value specified, but includes slight variations or deviations therefrom, caused by measuring error, manufacturing tolerances, stress exerted on various parts, wear and tear, or combinations thereof, for example.

The use of the term "at least one" will be understood to include one as well as any quantity more than one, including but not limited to each of, 2, 3, 4, 5, 10, 15, 20, 30, 40, 50, 100, and all integers there between. The term "at least one" may extend up to 100 or 1000 or more, depending on the term to which it is attached; in addition, the quantities of 100/1000 are not to be considered limiting, as higher limits may also produce satisfactory results. Singular terms shall include pluralities and plural terms shall include the singular unless indicated otherwise.

The term "or combinations thereof" as used herein refers to all permutations and/or combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

Finally, as used herein any reference to "one embodiment" or "an embodiment" means that a particular element, feature, structure, or characteristic described in connection with the embodiment is included in at least one embodiment.

The appearances of the phrase "in one embodiment" in various places in the specification are not necessarily referring to the same embodiment, although the inventive concepts disclosed herein are intended to encompass all combinations and permutations including one or more features of the embodiments described herein.

Figure 1:
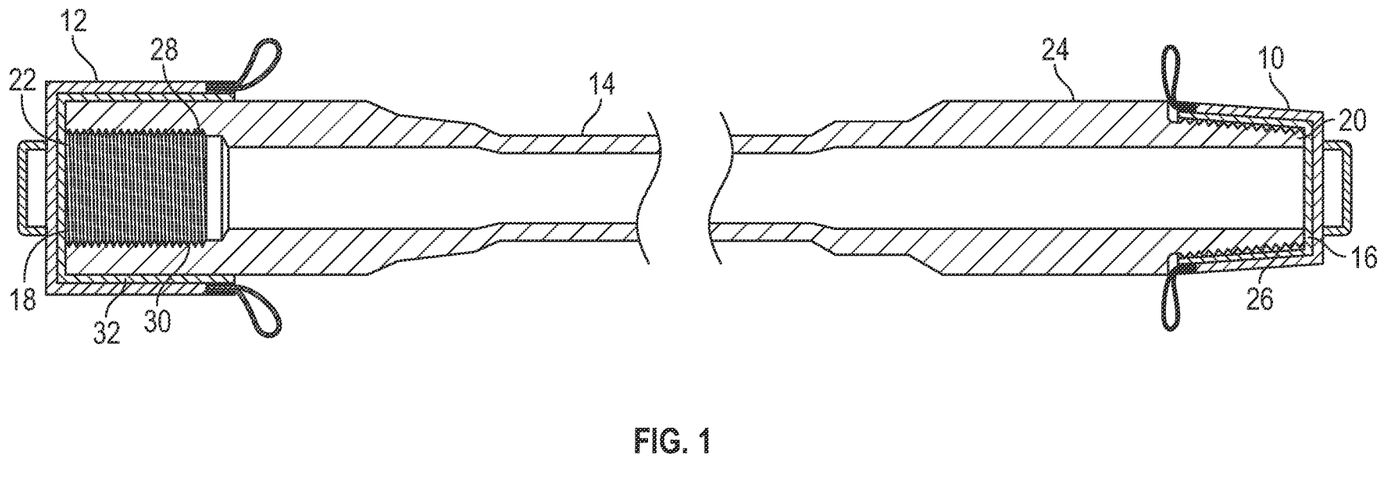
FIG. 1 is a cross section of a first cover and a second cover shown positioned on a tubular in accordance with the inventive concepts disclosed herein.

Referring now to the drawings, and in particular to FIG. 1, shown therein is an embodiment of a first cover 10 and a second cover 12 for a tubular, such as a tubular 14. The first cover 10 and the second cover 12 may be used for protecting a first end 16 and a second end 18 of the tubular 14. For example, the first cover 10 and the second cover 12 may be used to protect the threaded ends of a drill pipe after the threads of the drill pipe are cleaned and/or the drill pipe is drifted and then stored. Such a drill pipe is illustrated in FIG. 1 as the tubular 14. However, it should be appreciated that the first cover 10 and the second cover 12 may be used on the ends of a variety of other types of tubulars including, but not limited to, casing, tubing, and pup joints, and sucker rods.

As shown in FIG. 1, the first end 16 of the tubular 14 may be a pin end 20, and the second end 18 of the tubular 14 may be a box end 22. The first cover 10 is positioned on the pin end 20 and the second cover 12 is positioned on the box end 22. The pin end 20 includes a tong region 24 and a threaded region 26. The first cover 10 is shown positioned on the threaded region 26 adjacent the tong region 24. The box end 22 includes a threaded region 28 on an inner surface 30 of the tubular 14 opposite an outer surface 32. The second cover 12 is shown positioned on the outer surface 30 of the tubular 14. In the embodiment shown in FIG. 1, the first cover 10 and the second cover 12 are formed of different sizes corresponding to the size of pin end 20 and the size of the box end 22 of the tubular 14. The first and second covers 10 and 12 may protect the threaded regions 26 and 28 from thread erosion while the tubular 14 is being stored after cleaning and between usages.

Figure 2:
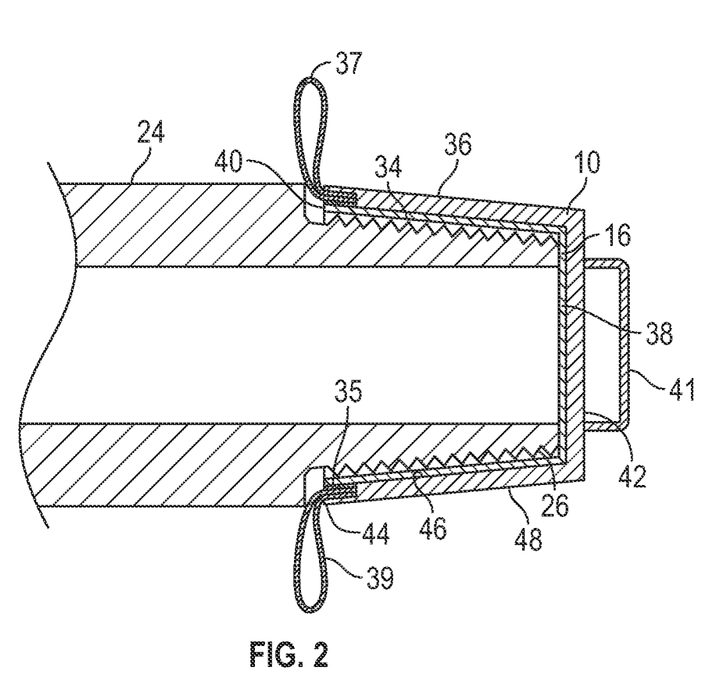
FIG. 2 is a cross section of the first cover shown positioned on the tubular.
Figure 4:
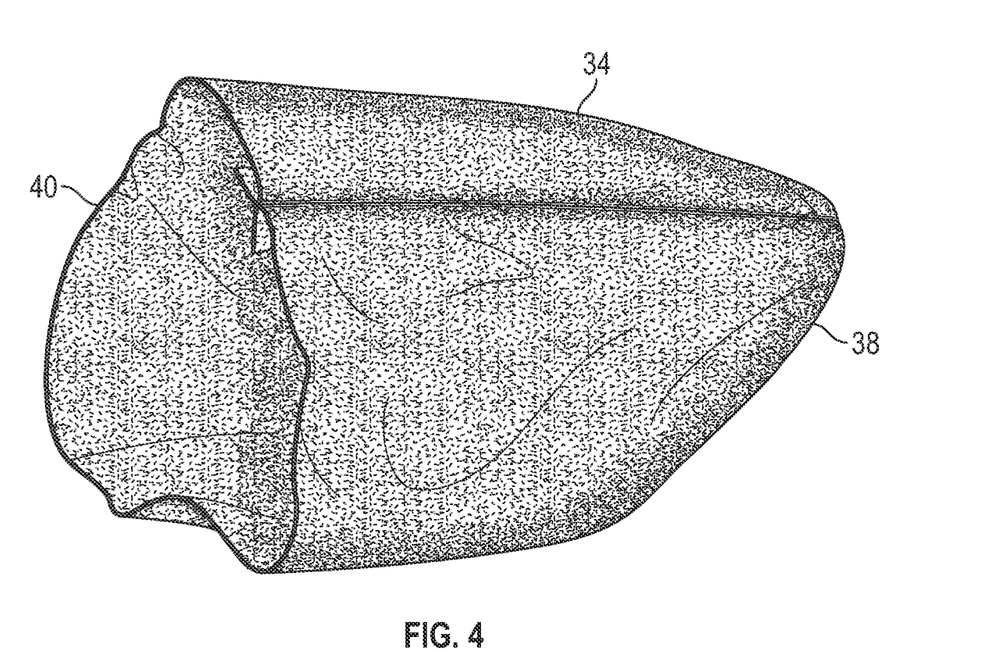
FIG. 4 is a perspective view of an inner layer of the first cover.
Figure 5:
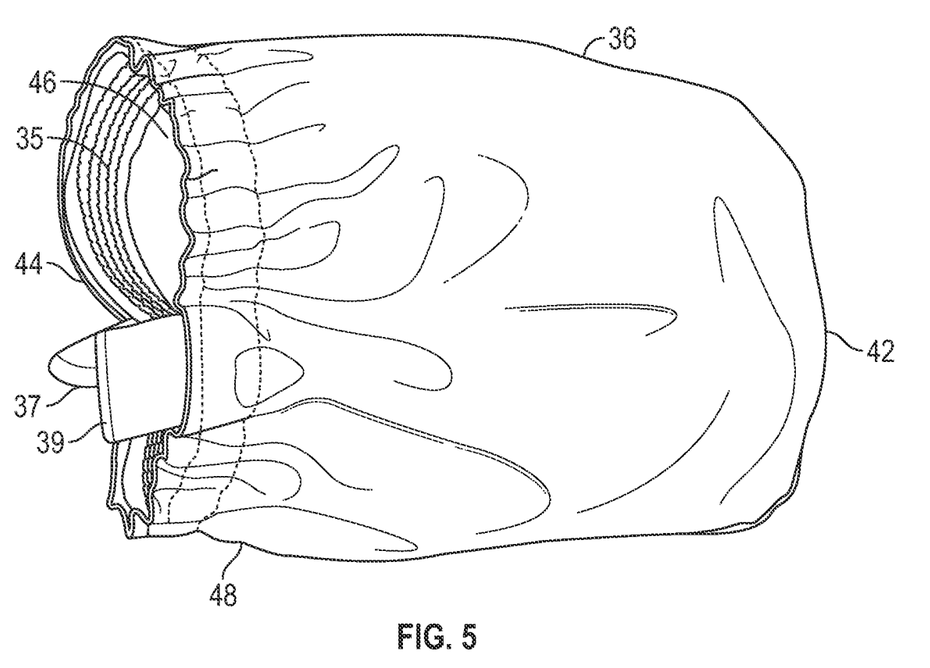
FIG. 5 is a perspective view of an outer layer of the first cover.

As best shown in FIGS. 2 and 4-5, the first cover 10 includes an inner sleeve 34, an outer sleeve 36, an elastic band 35 attached to the outer sleeve 36, a pair of tabs 37 and 39 extending from the outer sleeve 36, and a handle 41 extending from the outer sleeve 36. As shown in FIG. 2, the outer sleeve 36 is connected to the tubular 14 when the first cover 10 is positioned on the first end 16 or the box end 20 of the tubular 14.

Figure 6:
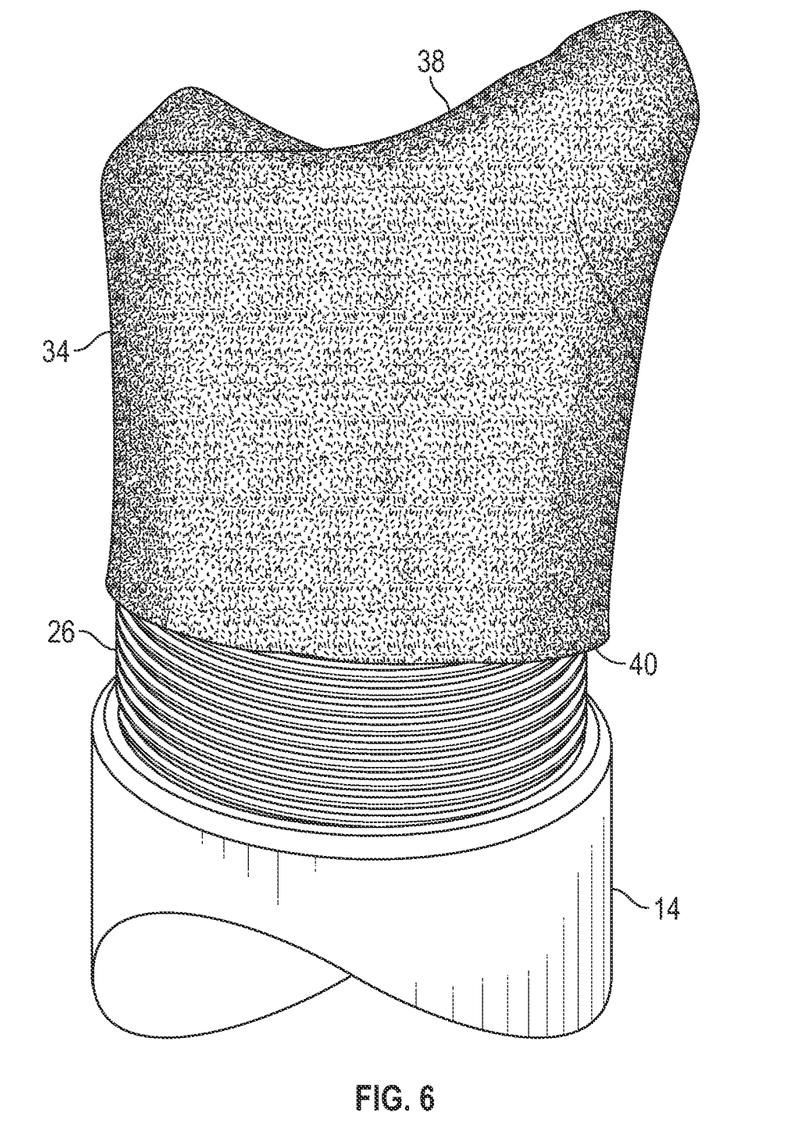
FIG. 6 is a side elevational view of the inner layer of the first cover shown partially positioned on the tubular.

The inner sleeve 34 of the first cover 10 has a closed end 38 and an open end 40 for receiving the threaded region 26 of the first end 16 of the tubular 14. A user may slide the inner sleeve 34 over the first end 16 of the tubular 14. As shown in FIG. 6, the inner sleeve 34 may fit over the first end 16 of the tubular 14 like a cap.

The inner sleeve 34 of the first cover 10 comprises a fluid absorbent material. One having ordinary skill in the art should appreciated that the inner sleeve 34 may comprise a variety of fluid absorbent materials including, but not limited to, synthetic felt, wool felt, fleece, polyester, and bamboo fiber. For example, felt has wicking qualities, is wear resistant, can be cut with a clean edge, and can be exposed to environmental elements. The fluid absorbent inner sleeve 34 may help protect the threaded region 26 of the pipe 14 from rust and moisture producing environmental elements by absorbing fluid from the threaded region 26 while the tubular 14 is not in use thereby preventing moisture build-up.

The inner sleeve 34 of the first cover 10 may be sized to substantially correspond with the size of the first end 16 or the pin end 20 of the tubular 14 to fit snugly about the threaded region 26.

The outer sleeve 36 of the first cover 10 includes a closed end 42, an open end 44, an inner surface 46 and an outer surface 48. The open end 44 of the outer sleeve 36 is connected to the tubular 14 when the first cover 10 is positioned on the first end 16 or the pin end 20 of the tubular 14.

Figure 7:
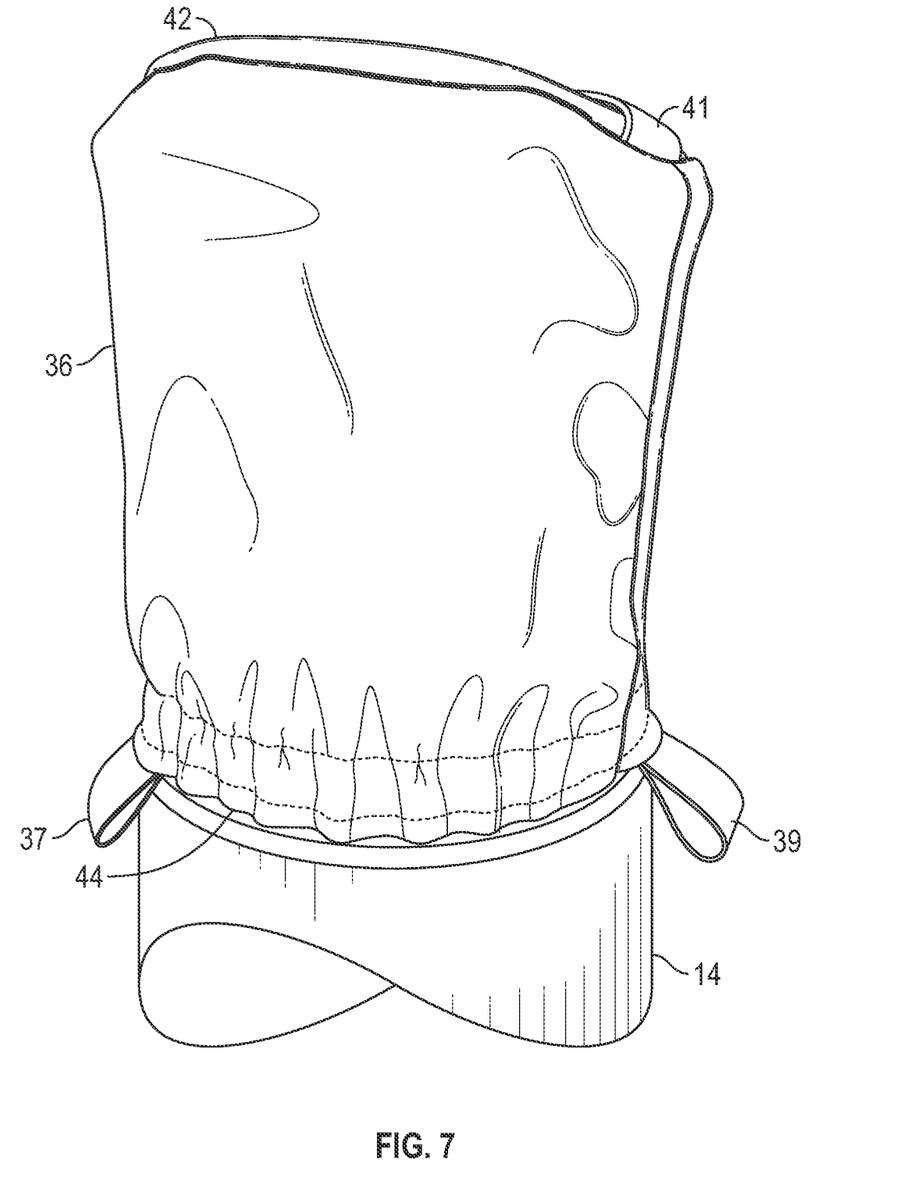
FIG. 7 is a side elevational view of the outer layer of the first cover shown positioned on the tubular.
Figure 8:
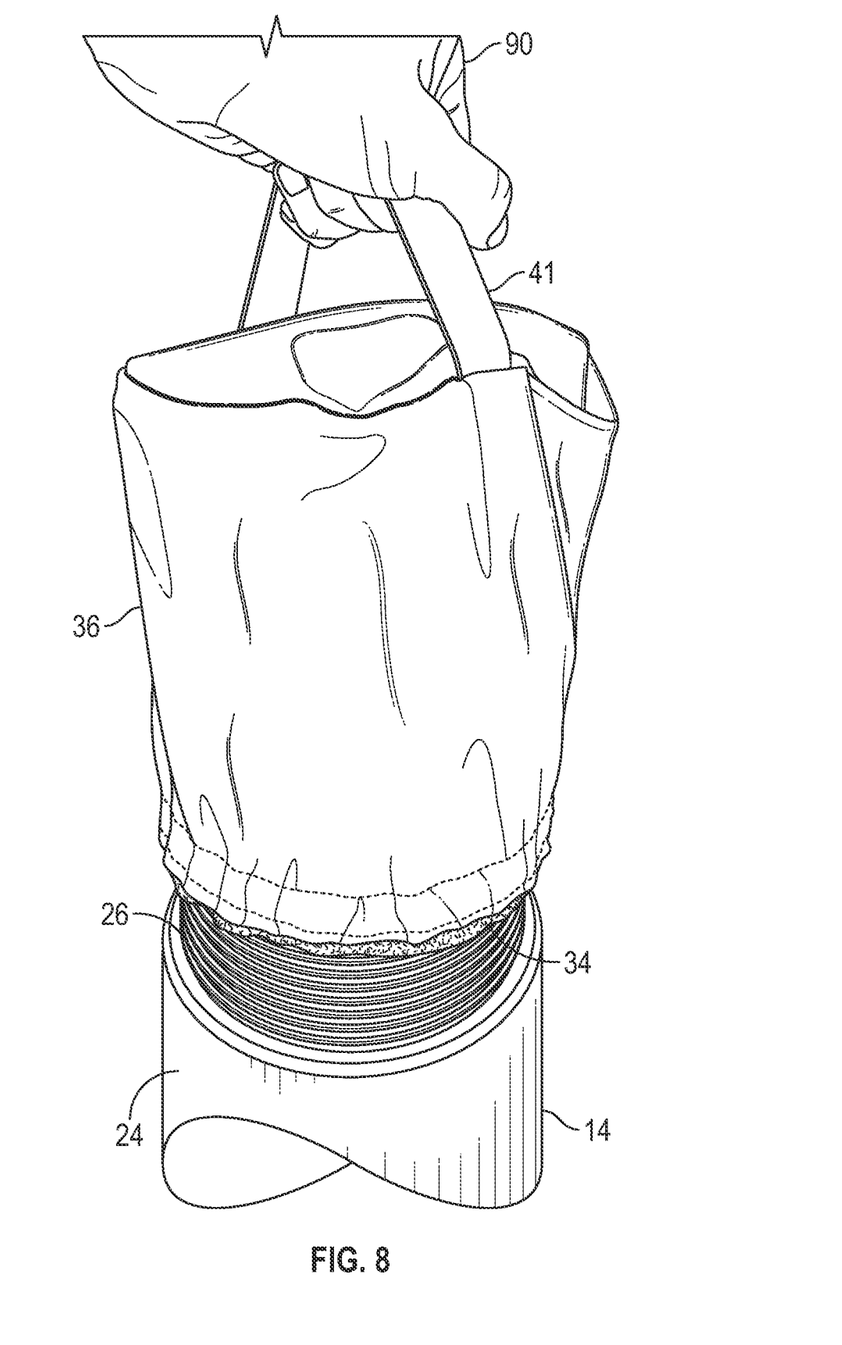
FIG. 8 is a side elevational view of the outer layer of the first cover shown being removed from the tubular.

The elastic band 35 may be attached to the inner surface 46 of the outer sleeve 36 at the open end 44 for sealing the outer sleeve 36 about the tubular 14. The open end 44 of the outer sleeve 36 may be ruched. As best shown in FIGS. 2, 5, and 7, the pair of tabs 37 and 39 may extend from the open end 44 of the outer sleeve 26. A user (such as user 90 shown in FIG. 8) may pull on the tabs 37 and 38 to slide the outer sleeve 36 over the inner sleeve 34 and over the threaded region 26 of the tubular 14 until the open end 44 is positioned next to the tong region 24. The elastic band 35 may hold the first cover 10 on the first end 16 of the tubular 14 until the cover 10 is ready to be removed. A shown in FIG. 8, the user may then slide the outer sleeve 36 off of the first end 16 of the tubular 14 by pulling on the handle 41 extending from the closed end 38 of the outer sleeve 36 of the first cover 10.

The outer sleeve 36 includes a fluid resistant material, such as vinyl.

The outer sleeve 36 may also be sized to substantially correspond with the size of the pin end 20 of the tubular 14 to fit about the inner layer 34 when the inner layer 34 is positioned on the pin end 20.

Figure 3:
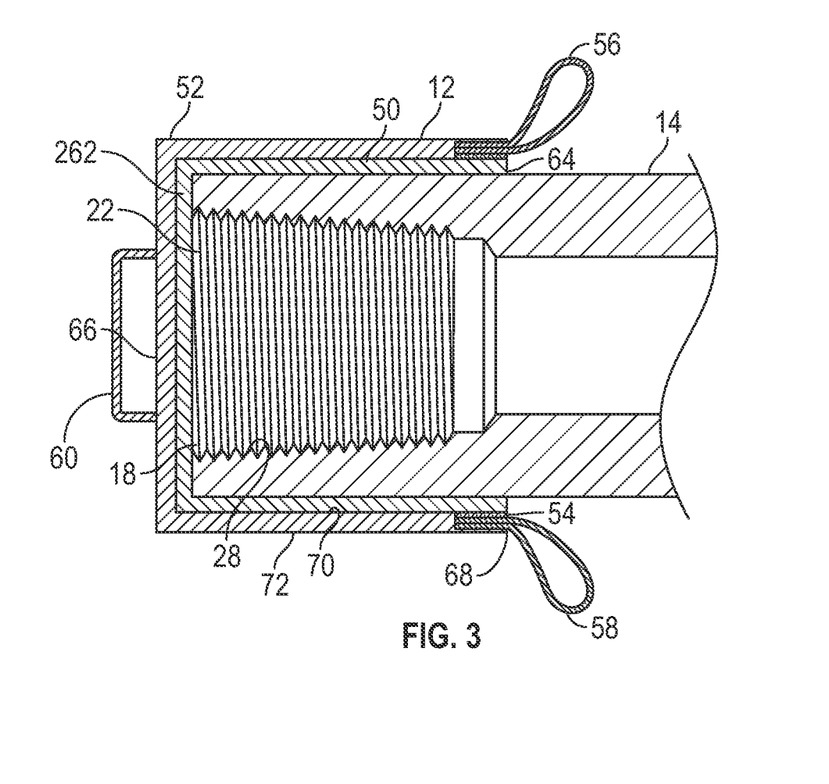
FIG. 3 is a cross section of the second cover shown positioned on the tubular.

The second cover 12 is constructed substantially similar to first cover 10 varying in size to substantially correspond to the size and dimensions of the second end 18 or the box end 22 of the tubular 14. As best shown in FIG. 3, the second cover 12 includes an inner sleeve 50, an outer sleeve 52, an elastic band 54 attached to the outer sleeve 52, a pair of tabs 56 and 58 extending from the outer sleeve 52, and a handle 60 extending from the from the outer sleeve 52. The outer sleeve 52 is sealably connected to the tubular 14 when the cover 12 is positioned on the tubular 14.

The inner sleeve 50 has a closed end 62 and an open end 64 for receiving the second end 18 or the box end 22 of the tubular 14. The user 90 may slide the inner sleeve 50 over the second end 18 of the tubular 14 so the inner sleeve 50 fits over the second end 18 of the tubular 14 like a cap.

Like the inner sleeve 34, the inner sleeve 50 comprises a fluid absorbent material. One having ordinary skill in the art should appreciated that the inner sleeve may comprise a variety of fluid absorbent materials including, but not limited to, synthetic felt, wool felt, fleece, polyester, and bamboo fiber. For example, felt is known in the art to possess wicking qualities, be wear resistant, cut with a clean edge, and be capable of being exposed to environmental elements. The fluid absorbent inner sleeve 50 may help protect the threaded region 28 of the tubular 14 from rust and moisture producing environmental hazards by absorbing fluid from the threaded region 28 while the tubular 14 is not in use and thereby preventing moisture build-up.

The inner sleeve 50 may be sized to substantially correspond with the size of the box end 22 of the tubular 14.

The outer sleeve 52 includes a closed end 66, an open end 68, an inner surface 70 and an outer surface 72. The open end 68 of the outer sleeve 52 is sealably connected to the tubular 14 when the second cover 12 is positioned on the tubular 14.

The elastic band 54 may be attached to the inner surface 70 of the outer sleeve 52 at the open end 68 for sealing the outer sleeve 52 about the second end 18 or the box end 22 of the tubular 14. The open end 68 of the outer sleeve 52 may be ruched for forming a tightening effect at the open end 68. The pair of tabs 56 and 58 may extend from the open end 64 of the outer sleeve 52. The user 90 may pull on the tabs 56 and 58 to slide the outer sleeve 52 over the inner sleeve 50 and over the second end 18 or the box end 22 of the tubular 14. The elastic band 54 may hold the second cover 12 on the second end 18 of the tubular 14 until the second cover 12 is ready to be removed. When ready, the user 90 may then slide the outer sleeve 52 off of the second end 18 of the tubular 14 by pulling on the handle 60 extending from the closed end 66 of the outer sleeve 52 of the second cover 12. The pair of tabs 37 and 39 and the pair of tabs 56 and 58 may be color coded to readily indicate to the user 90 which cover is the first cover 10 and which cover is the second cover 12.

Like the outer sleeve 36 of the first cover 10, the outer sleeve 52 of the second cover 12 comprises a fluid resistant material, such as vinyl.

The outer sleeve 52 of the second cover 12 may be sized to substantially correspond with the size of the second end 18 or box end 22 of the tubular 14 to fit about the inner sleeve 50 when the inner layer 50 is positioned on the box end 22.

As shown in FIG. 1, the first cover 10 and the second cover 12 are positioned on the first end 16 and the second end 18 of the tubular 14, respectively. The first cover 10 and the second cover 12 protect the threaded regions 26 and 28 from environmental damage caused by otherwise being exposed to the elements when the tubular 14 is not in use-thereby extending the life of the tubular 14. The inner sleeves 34 and 50 of the first and second covers 12 and 14 possess moisture absorbing properties that help reduce rust and other negative effects cause by moisture buildup. The outer sleeves 36 and 52 possess water resistant properties that prevent water from entering the first and second ends 16 and 18 of the tubular 14. The outer sleeves 36 and 52 hold the first and second covers 12 and 14 snuggly about the first and second ends 16 and 18 of the tubular 14 but are also easily removable since the outer sleeves 36 and 52 are made of flexible materials and may be slid off the first and second ends 16 and 18 by pulling on the handles 41 and 60. As such, the first and second covers 10 and 12 provide a user-friendly means for protecting the threaded regions 26 and 28 of the tubular 14.

From the above description, it is clear that the inventive concepts disclosed and claimed herein are well adapted to carry out the objects and to attain the advantages mentioned herein, as well as those inherent in the invention. While exemplary embodiments of the inventive concepts have been described for purposes of this disclosure, it will be understood that numerous changes may be made which will readily suggest themselves to those skilled in the art and which are accomplished within the spirit of the inventive concepts disclosed and claimed herein.

What is claimed is:

1. A cover for a tubular having a threaded end, comprising:
    an inner sleeve having a closed end and an open end and formed of a fluid absorbent material, the inner sleeve positionable about the threaded end of the tubular;
    an outer sleeve having a closed end and an open end and formed of fluid resistant material, the outer sleeve disposed about the inner sleeve; and
    an elastic band attached to the open end of the outer sleeve.

2. The cover of claim 1, wherein the open end of the outer sleeve is ruched.

3. The cover of claim 1, further comprising:
    a first tab extending from the open end of the outer sleeve; and
    a second tab extending from the open end of the outer sleeve.

4. The cover of claim 1, further comprising:
    a handle extending from the closed end of the outer sleeve.

5. A cover in combination with a tubular having at least one threaded end, the cover comprising:
    an inner sleeve having a closed end and an open end and formed of a fluid absorbent material, the inner sleeve positioned about the threaded end of the tubular; and
    an outer sleeve having a closed end and an open end and formed of a fluid resistant material, the outer sleeve positioned about the inner sleeve; and
    an elastic band attached to the open end of the outer sleeve.

6. The combination of claim 5, wherein the threaded end of the tubular includes threads formed on an external side of the tubular.

7. The combination of claim 5, wherein the threaded end of the tubular includes threads formed on an internal side of the tubular.

8. The combination of claim 5, wherein the open end of the outer sleeve is ruched.

9. The combination of claim 5, further comprising:
    a first tab extending from the open end of the outer sleeve; and
    a second tab extending from the open end of the outer sleeve.

10. The combination of claim 5, further comprising:
    a handle extending from the closed end of the outer sleeve.

11. A tubular, comprising:
    a tubular body having a first end and a second end, the first end having a first threaded region and the second end having a second threaded region;
    a first cover, comprising:
        a first inner sleeve having a closed end and an open end and formed of a fluid absorbent material, the first inner sleeved positioned about the first threaded region;
        a first outer sleeve having a closed end and an open end and formed of a fluid resistant material, the first outer sleeve positioned about the first inner sleeve; and
        a first elastic band attached to the open end of the first outer sleeve; and
    a second cover, comprising:
        a second inner sleeve having a closed end and an open end and formed of a fluid absorbent material, the second inner sleeved positioned about the second threaded region;
        a second outer sleeve having a closed end and an open end and formed of a fluid resistant material, the second outer sleeve positioned about the second inner sleeve; and
        a second elastic band attached to the open end of the second outer sleeve.

12. The tubular of claim 11, wherein the first threaded region is formed on an external side of the tubular body.

13. The tubular of claim 12, wherein the second threaded region is formed on an internal side of the tubular body.

14. The tubular of claim 11, wherein the first cover further comprises a first tab and a second tab extending from the open end of the first outer sleeve, and wherein the second cover further comprises a first tab and a second tab extending from the open end of the second outer sleeve.

15. The tubular of claim 11, wherein the first cover further comprises a handle extending from the closed end of the first outer sleeve, and wherein the second cover further comprises a handle extending from the closed end of the second outer sleeve.

\* \* \* \* \*